United States Patent
Wieczorek et al.

(10) Patent No.: US 10,744,932 B2
(45) Date of Patent: Aug. 18, 2020

(54) CONTROL AND MONITORING CIRCUIT FOR CONTROLLING LIGHTING SYSTEM

(71) Applicant: SMR Patents S.à.r.l., Luxembourg (LU)

(72) Inventors: Romeo Wieczorek, Stuttgart (DE); Andreas Herrmann, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 16 days.

(21) Appl. No.: 16/173,417

(22) Filed: Oct. 29, 2018

(65) Prior Publication Data
US 2019/0061607 A1    Feb. 28, 2019

Related U.S. Application Data

(63) Continuation-in-part of application No. 15/377,571, filed on Dec. 13, 2016, and a continuation-in-part of (Continued)

(30) Foreign Application Priority Data

Dec. 23, 2015 (EP) ..................... 15202515
Nov. 28, 2016 (DE) ............ 10 2016 122 933

(51) Int. Cl.
| | |
|---|---|
| *H05B 45/10* | (2020.01) |
| *H05B 45/325* | (2020.01) |
| *H05B 47/165* | (2020.01) |
| *B60Q 1/38* | (2006.01) |
| *F21S 43/14* | (2018.01) |
| *F21S 43/20* | (2018.01) |

(Continued)

(52) U.S. Cl.
CPC ............ *B60Q 1/38* (2013.01); *B60R 11/04* (2013.01); *F21S 43/14* (2018.01); *F21S 43/15* (2018.01); *F21S 43/235* (2018.01); *F21S 43/255* (2018.01); *H05B 45/10* (2020.01); *H05B 45/37* (2020.01); *B60R 1/00* (2013.01); *H05B 47/18* (2020.01)

(58) Field of Classification Search
CPC ............ B60R 11/04; B60R 2001/1253; B60R 21/1538; H05B 33/0818; H05B 33/0845; H05B 37/029; H05B 41/34
See application file for complete search history.

(56) References Cited

U.S. PATENT DOCUMENTS 3,883,845 A * 5/1975 DeVita ................. B60Q 11/007
340/431
4,201,415 A * 5/1980 Suchanek .............. B60K 11/00
180/68.1

(Continued)

FOREIGN PATENT DOCUMENTS

JP    06032170 A  *  2/1994

*Primary Examiner* — Henry Luong
(74) *Attorney, Agent, or Firm* — Jones Day

(57) ABSTRACT

A control circuit includes a first light source, a second light source, an input channel for receiving an input signal, at most two output channels each configured to control one of the first light source and the second light source, where the control circuit is configured to use at most two cables, and is capable of permanently powering on one of the first light source and the second light source while, at the same time, flashing on and off the other of the first light source and the second light source.

20 Claims, 8 Drawing Sheets

Related U.S. Application Data application No. 15/384,047, filed on Dec. 19, 2016, now Pat. No. 10,124,722.

(51) Int. Cl.

| | | |
|---|---|---|
| *B60R 11/04* | (2006.01) | |
| *F21S 43/15* | (2018.01) | |
| *F21S 43/235* | (2018.01) | |
| *H05B 45/37* | (2020.01) | |
| *B60R 1/00* | (2006.01) | |
| *H05B 47/18* | (2020.01) | |

(56) References Cited

U.S. PATENT DOCUMENTS

| | | | |
|---|---|---|---|
| 5,715,093 A * | 2/1998 | Schierbeek | B60Q 1/1423 |
| | | | 359/265 |
| 8,674,285 B2 | 3/2014 | Drummond et al. | |
| 2002/0075148 A1* | 6/2002 | Boyer | B60Q 1/444 |
| | | | 340/479 |
| 2004/0178739 A1* | 9/2004 | Numajiri | B60Q 1/085 |
| | | | 315/82 |
| 2008/0048567 A1* | 2/2008 | Steele | H05B 45/50 |
| | | | 315/151 |
| 2011/0181197 A1* | 7/2011 | Kanda | B60Q 1/38 |
| | | | 315/268 |
| 2014/0015408 A1* | 1/2014 | Cordier | H05B 33/0842 |
| | | | 315/77 |
| 2015/0158414 A1* | 6/2015 | Ohta | B60Q 1/00 |
| | | | 315/77 |
| 2016/0207444 A1 | 7/2016 | Tatara et al. | |

* cited by examiner

CONTROL AND MONITORING CIRCUIT FOR CONTROLLING LIGHTING SYSTEM

CROSS-REFERENCE TO RELATED APPLICATIONS

This application is a continuation-in-part of U.S. patent application Ser. No. 15/377,571, filed Nov. 28, 2016, which claims the benefit of priority to German Patent Application DE 10 2016 122 933.4, filed Nov. 28, 2016, and this application is a continuation-in-part of U.S. patent application Ser. No. 15/384,047, filed Dec. 19, 2016, which claims the benefit of priority to European Patent Application No. 15 202 515, filed Dec. 23, 2015, each of which is hereby incorporated by reference in its entirety for all purposes.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The following description relates to a signal light that is integrated in a module housing of a vehicle. For example, a vehicle may include a camera module for providing a driver with a view of the side or rear of the vehicle, and the camera module housing may include one or more signaling lamps that may be used as indicators, warning lights, blind spot assistance lights, welcoming lights, among other uses. The camera module housing may be integrated with a side-view mirror, may be separate from a side-view mirror, or may replace a side-view mirror so that the vehicle includes the camera module housing without a side-view mirror.

The following description also relates to a control circuit for controlling a lighting application in a vehicle. For example, a monitoring circuit and a rear view display device for a vehicle having such a control circuit or monitoring circuit installed therein. According to one example, a control circuit may activate a first light source to flash while simultaneously activating a second light source to be permanently lit.

2. Related Art

With the emergence of autonomous vehicles, several concepts have been developed for identifying or marking autonomous vehicles as compared to manually operated vehicles on the road. One common concept is to mark autonomous vehicles using a new light-drive so that others road users may see the light from any angle and identify the vehicle as an autonomous vehicle. This may include activating the mirror indicator so that it is permanently lit in a different color. However, if the vehicle were to make a turn, the turn signal would no longer be available as it is being permanently lit in a different color. Further, the color of the turn signal is regulated by law and, in certain jurisdictions, may not be changed to a different color. Thus, according to at least one aspect, there is a need for a mechanism which controls two light sources to operate simultaneously.

In other applications, turn signal lamps are used to replace side-view mirrors where turn signal lamps include a camera for providing a driver with a view of the side or rear of the vehicle. That is, side-view mirrors are being replaced with camera modules that include a lighting mechanism for turn signals. Such turn signal lamps or camera modules are typically positioned on the side of the vehicle and include light emitting diodes (LEDs) and light guides that are arranged so that drivers of other vehicles can easily detect when a driver intends to turn. For example, U.S. Patent Application Publication No. 2016/207444 A1 to Tatara, et al. describes a camera module housing that includes light emitting diodes and light passages that are arranged for turn signal indication.

In vehicle lighting applications, lighting devices having different colors may be used and separately controllable. If several lighting devices, e.g. light sources that have different colors and which are separately controllable, are used in components of a vehicle, for example in a rear view mirror, additional wiring, such as wiring for a second supply voltage, and/or a BUS connection needs to be utilized for controlling the lighting devices independently from each other such that the indicator can alternately flash in different colors.

For example, U.S. Pat. No. 8,674,285 B2 to Drummond, et al. describes a vehicle rearview device system, wherein several devices comprised in a rear-view device are controlled via a vehicle's bus system, such as a LIN, CAN, Flexray or Ethernet system or an SMBus. However, most rear view devices do not include interfaces for an additional voltage supply and/or an interface for the vehicle's BUS system to control several lighting devices independently. Also, introducing corresponding interfaces would increase the complexity and costs of the overall system.

Therefore, camera modules that include an improved arrangement of LEDs and light guides for providing improved visibility to a driver of a vehicle is needed. Also, versatility in light indications provided by a camera module; for example, by using indicators that include more than one color is needed. Further, there is a need for an improved control circuit that can be used for controlling at least two lighting devices and that doesn't need to be connected to a vehicle's bus system, and/or doesn't need to utilize several input voltages to control the lighting devices independently.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In an aspect, a control circuit includes an input channel for receiving a pulse width modulated (PWM) signal, a first light source and a first output channel which is adapted to control on and off states of the first light source, and a second light source and a second output channel which is adapted to control on and off states of the second light source connected to the second output channel, where the first output channel is adapted to turn the first light source on and the second output channel is adapted to turn the second light source off based on a first PWM signal, the first output channel is adapted to turn the first light source off and the second output channel is adapted to turn the second light source on based on a second PWM signal, and the first output channel is adapted to turn the first light source on and the second output channel is adapted to turn the second light source on, at the same time, based on a third PWM signal.

In response to either the first PWM signal or the second PWM signal being transmitted consecutively with the third PWM signal during a period of time, one of the first light source and the second light source may be permanently lit while the other of the first light source and the second light source flashes on and off.

The first and the second light source may include at least one light each or an array of lights, wherein the first light source comprises a first light having a first color, and wherein the second light source comprises a second light having a second color.

The first and second colors may be different colors, and the first and second light sources may be provided in a side-turn indicator.

Each of the first and second light sources may include at least one of a Light Emitting Diode (LED), a light bulb, a halogen lamp, an arc lamp, a Xenon arc lamp, a fluorescent lamp, a neon lamp, and an electrodeless lamp.

At least one of the first output channel or the second output channel may include a delay circuit for time delaying the output channel.

The first PWM signal may include a duty cycle rate of 20%, the second PWM signal may include a duty cycle rate of 100%, and the third PWM signal may include a duty cycle rate of 80%.

The control circuit may include at least one filter circuit to extract information from each of the first PWM signal, the second PWM signal, and the third PWM signal.

The PWM signal may include the supply voltage for at least one of the first light source or the second light source.

In another aspect, a rear view display device for a vehicle includes the control circuit.

In yet another aspect, a control circuit includes a first light source, a second light source, an input channel for receiving an input signal, at most two output channels each configured to control one of the first light source and the second light source, where the control circuit is configured to use at most two cables, and is capable of permanently powering on one of the first light source and the second light source while, at the same time, flashing on and off the other of the first light source and the second light source.

The input signal may be a pulse width modulated (PWM) signal.

Permanently powering on one of the first light source and the second light source while, at the same time, flashing on and off the other of the first light source and the second light source may be achieved by sending two PWM signals one after the other for a period of time.

The two PWM signals may have different duty cycles.

The first and the second light source may include at least one light each or an array of lights, where the first light source includes a first light having a first color, and the second light source includes a second light having a second color.

The first and second colors may be different colors, and the first and second light sources may be provided in a side-turn indicator.

Each of the first and second light sources may include at least one of a Light Emitting Diode (LED), a light bulb, a halogen lamp, an arc lamp, a Xenon arc lamp, a fluorescent lamp, a neon lamp, and an electrodeless lamp.

One or both of the at most two output channels may include a delay circuit for time delaying the output channel.

The input signal may be a PWM signal having a duty cycle rate of 20%, 80%, or 100%.

The control circuit may include at least one filter circuit to extract information from the input signal.

The input signal may include the supply voltage for at least one of the first light source or the second light source.

In a further aspect, a rear view display device for a vehicle includes the control circuit.

DESCRIPTION OF THE SEVERAL VIEWS OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown. The accompanying drawings, which are incorporated in and constitute a part of this specification, illustrate an implementation of systems and apparatuses consistent with the present invention and, together with the description, serve to explain advantages and principles consistent with the invention.

Figure 1:
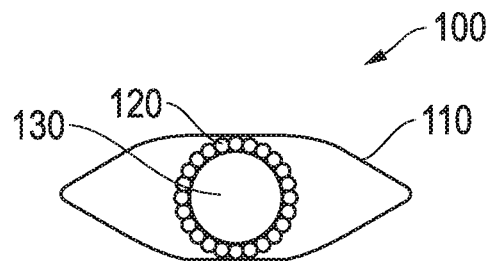
FIG. 1 is a diagram illustrating the arrangement of light passages around a camera lens that is mounted at the rear surface (seen from the driving direction) of the camera module housing.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE INVENTION

Before explaining at least one example of the invention in detail, it is to be understood that the invention is not limited in its application to the details of construction and to the arrangements of the components set forth in the following description or illustrated in the drawings. The Figures and written description are provided to teach any person skilled in the art to make and use the inventions for which patent protection is sought. The invention is capable of other embodiments and of being practiced and carried out in various ways. Those skilled in the art will appreciate that not all features of a commercial embodiment are shown for the sake of clarity and understanding. Persons of skill in the art will also appreciate that the development of an actual commercial embodiment incorporating aspects of the present inventions will require numerous implementation—specific decisions to achieve the developer's ultimate goal for the commercial embodiment. While these efforts may be complex and time-consuming, these efforts nevertheless would be a routine undertaking for those of skill in the art having the benefit of this disclosure.

In addition, it is to be understood that the phraseology and terminology employed herein are for the purpose of description and should not be regarded as limiting. For example, the use of a singular term, such as, "a" is not intended as limiting of the number of items. Also the use of relational terms, such as but not limited to, "top," "bottom," "left," "right," "upper," "lower," "down," "up," "side," are used in the description for clarity in specific reference to the Figures and are not intended to limit the scope of the invention or the appended claims. Further, it should be understood that any one of the features of the invention may be used separately or in combination with other features. Other systems, methods, features, and advantages of the invention will be or become apparent to one with skill in the art upon examination of the Figures and the detailed description. It is intended that all such additional systems, methods, features, and advantages be included within this description, be within the scope of the present invention, and be protected by the accompanying claims.

The terms "input channel", "first output channel", and "second output channel" can be used to refer to components of the control circuit including interfaces, where a voltage can be applied to/supplied from. Also, the term "controlling the on and off states" can be used to refer to supplying a voltage at the corresponding output channel so that the lighting device connected to the output channel will start radiating light. The term "information" can be used to refer to any information in the input voltage signal, such as voltage values, frequencies, modulated signals on the input voltage, or its waveform, etc.

Referring to the embodiments illustrated in FIGS. 1-5, an arrangement of a signaling lamp in a rear surface (seen from the driving direction) of a camera module housing is illustrated. The arrangement of the light passages could be variable in the front area of the camera module. However, in this description, the light passages are chosen so that the light from the signaling lamp is visible from the side and behind the car and/or from the driver of the vehicle. The light passages can have essentially any shape, e.g. circular, rectangular, etc., and can be arranged on the surface of the camera module housing or around the lens of the camera.

FIG. 1 is a diagram illustrating the arrangement of light passages around a camera lens that is mounted at the rear surface (seen from the driving direction) of the camera module housing.

Referring to FIG. 1, the camera module 100 includes a camera module housing 110 that houses all components of the camera module 100. That is, the camera module housing 110 includes camera components and lighting components. As illustrated in FIG. 1, a plurality of light passages 120 are arranged around the periphery of a camera lens 130 and within the camera module housing 110. The light passages are chosen so that the light from the signaling lamp is visible from the side and behind the car and/or from the driver of the vehicle. The light passages can have essentially any shape, e.g. circular, rectangular, etc., and can be arranged on the surface of the camera module housing or around the lens of the camera.

Figure 2:
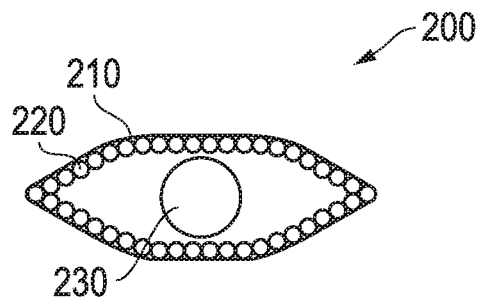
FIG. 2 is a diagram illustrating another arrangement of light passages around a camera module housing and a camera lens that is mounted at the rear surface (seen from the driving direction) of the camera module housing.

FIG. 2 is a diagram illustrating another arrangement of light passages around a camera module housing and a camera lens that is mounted at the rear surface (seen from the driving direction) of the camera module housing.

Referring to FIG. 2, the camera module 200 includes a camera module housing 210 that houses all components of the camera module 200. That is, the camera module housing 210 includes camera components and lighting components. As illustrated in FIG. 2, a plurality of light passages 220 are arranged within the periphery of the camera module housing 210 with the camera lens 230 enclosed therein. The light passages are chosen so that the light from the signaling lamp is visible from the side and behind the car and/or from the driver of the vehicle. The light passages can have essentially any shape, e.g. circular, rectangular, etc., and can be arranged on the surface of the camera module housing or around the lens of the camera.

Figure 3:
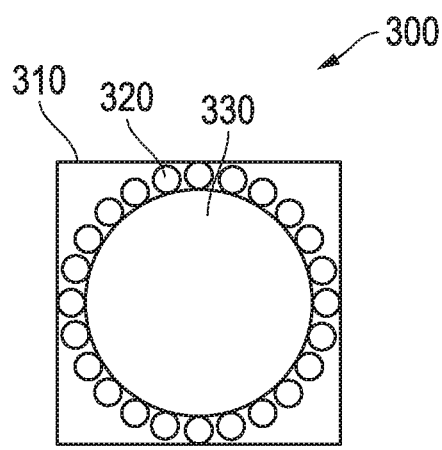
FIG. 3 is a diagram illustrating yet another arrangement of light passages around a camera lens that is mounted at the rear surface (seen from the driving direction) of the camera module housing.

FIG. 3 is a diagram illustrating yet another arrangement of light passages around a camera lens that is mounted at the rear surface (seen from the driving direction) of the camera module housing.

Referring to FIG. 3, the camera module 300 includes a camera module housing 310 that houses all components of the camera module 300. That is, the camera module housing 310 includes camera components and lighting components. As illustrated in FIG. 3, a plurality of light passages 320 are arranged around the periphery of a camera lens 330 and within the camera module housing 310. The light passages are chosen so that the light from the signaling lamp is visible from the side and behind the car and/or from the driver of the vehicle. The light passages can have essentially any shape, e.g. circular, rectangular, an icon, a freeform shape etc., and can be arranged on the surface of the camera module housing or around the lens of the camera.

Figure 4:
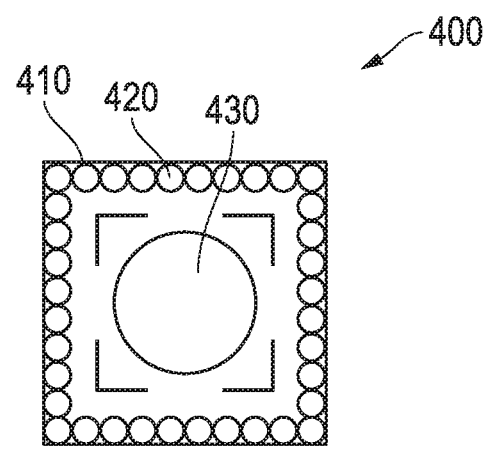
FIG. 4 is a diagram illustrating an additional arrangement of light passages around a camera module housing and a camera lens that is mounted at the rear surface (seen from the driving direction) of the camera module housing.

FIG. 4 is a diagram illustrating an additional arrangement of light passages around a camera module housing and a camera lens that is mounted at the rear surface (seen from the driving direction) of the camera module housing.

Referring to FIG. 4, the camera module 400 includes a camera module housing 410 that houses all components of the camera module 400. That is, the camera module housing 410 includes camera components and lighting components. As illustrated in FIG. 4, a plurality of light passages 420 are arranged within the periphery of the camera module housing 410 with the camera lens 430 enclosed therein. The light passages are chosen so that the light from the signaling lamp is visible from the side and behind the car and/or from the driver of the vehicle. The light passages can have essentially any shape, e.g. circular, rectangular, etc., and can be arranged on the surface of the camera module housing or around the lens of the camera.

Figure 5:
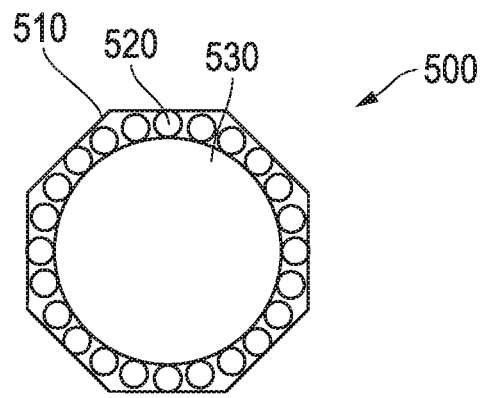
FIG. 5 is a diagram illustrating a further arrangement of light passages around a camera module housing and a camera lens that is mounted at the rear surface (seen from the driving direction) of the camera module housing.

FIG. 5 is a diagram illustrating a further arrangement of light passages around a camera module housing and a camera lens that is mounted at the rear surface (seen from the driving direction) of the camera module housing.

Referring to FIG. 5, the camera module 500 includes a camera module housing 510 that houses all components of the camera module 500. That is, the camera module housing 510 includes camera components and lighting components. As illustrated in FIG. 5, a plurality of light passages 520 are arranged within the periphery of the camera module housing 510 and around the periphery of the camera lens 530. The light passages are chosen so that the light from the signaling lamp is visible from the side and behind the car and/or from the driver of the vehicle. The light passages can have essentially any shape, e.g. circular, rectangular, etc., and can be arranged on the surface of the camera module housing or around the lens of the camera.

Figure 6A:
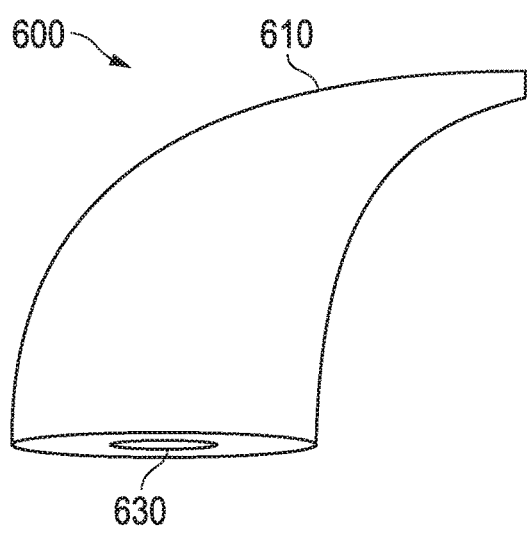
FIGS. 6A and 6B are diagrams illustrating an arrangement of an LED, light guide, and light passages in a camera module housing.
Figure 6B:
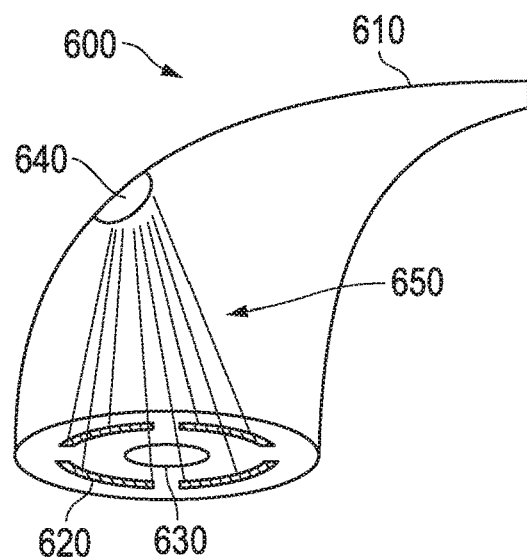

FIGS. 6A and 6B are diagrams illustrating an arrangement of an LED, light guide, and light passages in a camera module housing.

Referring to FIG. 6A, a top view of a camera module 600 including a camera module housing 610 and a camera lens 630 is illustrated. Referring to FIG. 6B, a plurality of light passages 620 are arranged around the camera lens 630 and within the camera housing 610. Also illustrated are an LED 640 and light guides 650. The light guides 650 extend from the LED to each of the light passages 620 so that the light passages 620 radiate the light provided by the LED 640. As in previous examples where the light passages are arranged on the rear surface (seen from the driving direction) of the camera module housing, here also the light passages 620 are arranged on the rear surface of the camera module housing 610.

Figure 7A:
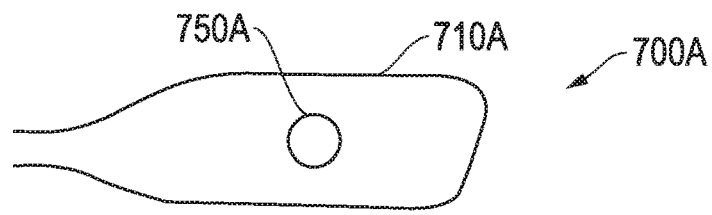
FIGS. 7A, 7B, and 7C are diagrams illustrating examples of the arrangement of a light guide on an outer surface of a camera module housing.
Figure 7B:
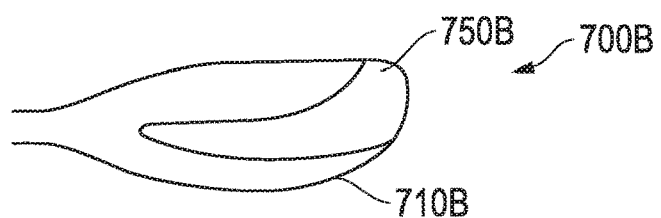
Figure 7C:
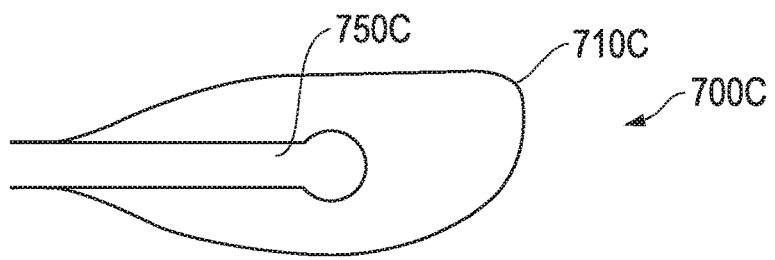

FIGS. 7A, 7B, and 7C are diagrams illustrating examples of the arrangement of a light guide on an outer surface of a camera module housing.

Referring to FIG. 7A, another example provides a light guide 750A arranged at the outer periphery of the camera module housing 710A of the camera module 700A (i.e. the part that points towards the street). The light guide 750A is arranged in the surface of the camera module housing 710A so that the light from the LED can be seen from the side and from behind the vehicle.

Referring to FIG. 7B, similar to FIG. 7A, another example provides a light guide 750B arranged at the outer periphery of the camera module housing 710B of the camera module 700B (i.e. the part that points towards the street). The light guide 750B is arranged in the surface of the camera module housing 710B so that the light from the LED can be seen from the side and from behind the vehicle.

Referring to FIG. 7C, similar to FIGS. 7A and 7B, another example provides a light guide 750C arranged at the outer periphery of the camera module housing 710C of the camera module 700C (i.e. the part that points towards the street). The light guide 750C is arranged in the surface of the camera module housing 710C so that the light from the LED can be seen from the side and from behind the vehicle.

Figure 8:
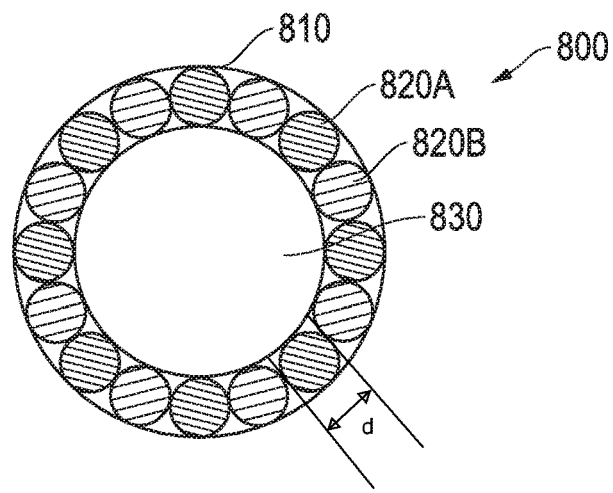
FIG. 8 is a diagram illustrating an arrangement of light passages connected to LEDs of different colors.

FIG. 8 is a diagram illustrating an arrangement of light passages connected to LEDs of different colors.

Referring to FIG. 8, another example of a camera module 800 is illustrated. In this example, the light passages 820A, 820B are arranged around a periphery of a camera lens 830 and within the boundary formed by the camera module housing 810. In this example, some of the light passages 820A are configured to receive light of a first color and some of the light passages 820B are configured to receive light of a second, different color. The signaling lamp could be used to radiate light in different colors, i.e. depending on a desired application. For example, orange light when used as indicator, red light when used as warning light for blind spot detection, and green or blue light for signaling that the car is being locked/unlocked. Still referring to FIG. 8, in an example, a diameter of any of the light passages 820A, 820B may range from 0.2 mm to 15 mm.

Figure 9A:
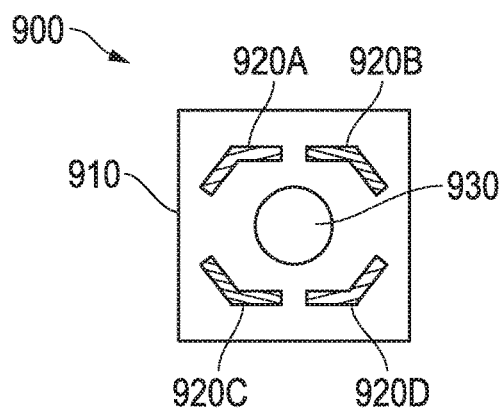
FIGS. 9A and 9B are diagrams illustrating an arrangement of light passages connected to two color LEDs.
Figure 9B:
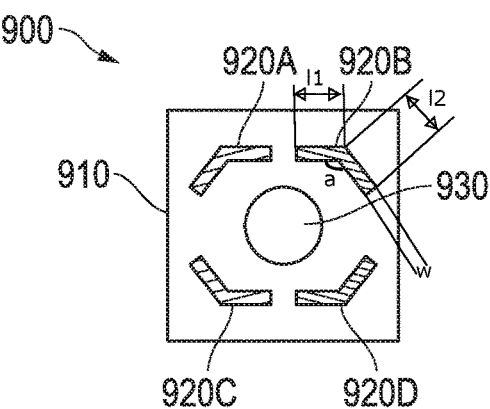

FIGS. 9A and 9B are diagrams illustrating an arrangement of light passages connected to two color LEDs.

In this example, four light passages 920A, 920B, 920C, and 920D are arranged between a camera lens 930 and the boundary formed by the camera housing 910. The camera module 900 is configured to flash according to a desired application. For example, as illustrated in FIG. 9A, at a first time period, the first light passage 920A and the fourth light passage 920D can have the same color, while the second light passage 920B and the third light passage 920C can have a second, different color. As illustrated in FIG. 9B, at a second time period, the first light passage 920A and the third light passage 920C can have the same color, while the second light passage 920B and the fourth light passage 920D can have a second, different color. Any number of iterations can be appreciated to a person having ordinary skill in the art.

Still referring to FIG. 9B, a first length l1 of any of the light passages 920A, 920B, 920C, 920D may range from 0.25 mm-17.5 mm and a second length l2 may range from 0.25 mm-17.5 mm and be different or the same such that an overall length l1 and l2 may range from 0.5 mm to 35 mm. A width w may range from 0.2 mm to 15 mm and an angle a around the lens may range from 90 degrees to 175 degrees, as illustrated in FIG. 9B.

Figure 10A:
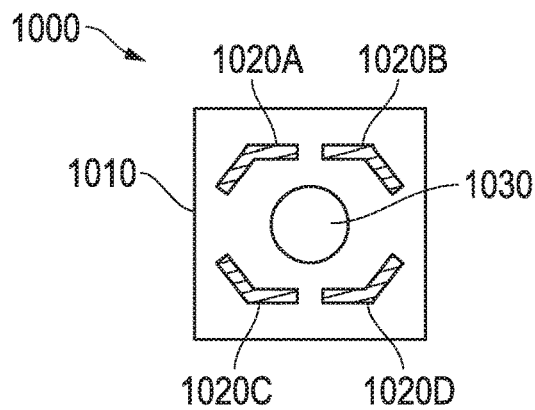
FIGS. 10A and 10B are diagrams illustrating another arrangement of light passages connected to two color LEDs.
Figure 10B:
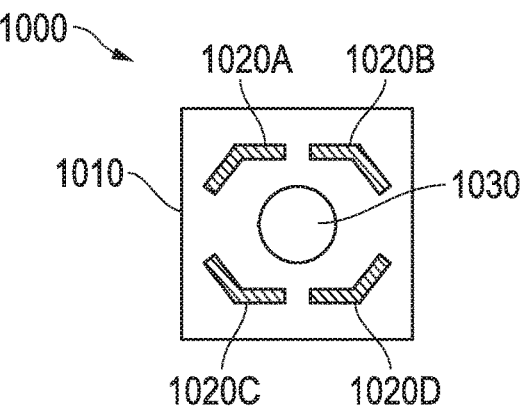

FIGS. 10A and 10B are diagrams illustrating another arrangement of light passages connected to two color LEDs.

In this example, four light passages 1020A, 1020B, 1020C, and 1020D are arranged between a camera lens 1030 and the boundary formed by the camera housing 1010. The camera module 1000 is configured to radiate a different color light according to a desired application. For example, as illustrated in FIG. 10A, at a first time period, all light passages 1020A-D can have the same first color. As illustrated in FIG. 10B, at a second time period, all light passages 1020A-D can have a second, different color. Any number of iterations can be appreciated to a person having ordinary skill in the art.

In another example, the camera module may include a signal lamp having only a single light source, for example a first light source, that is adapted to radiate light having a first color and a second color the first color being different from the second color. Such a light source may include a multi-color LED or any other light source that is adapted to radiate light having more than one color.

Figure 11:
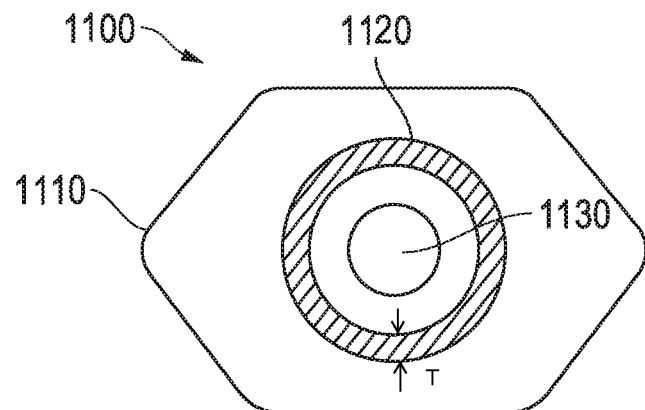
FIG. 11 is a diagram illustrating a single light passage arranged on a camera module housing.

Further, the camera module may include a single opening for example, but not limited to, a circle formed around the circumference of the camera lens. Referring to FIG. 11, a single light passage 1120 is arranged between a camera lens 1130 and the boundary formed by the camera module housing 1110. A thickness T of the light passage 1120 may, for example, range from 0.2 mm to 15 mm along the entire circumference of the light passage 1120. The camera module 1100 is configured to radiate different color light according to a desired application and in accordance with the examples described in this application. Any number of iterations can be appreciated to a person having ordinary skill in the art.

Figure 12:
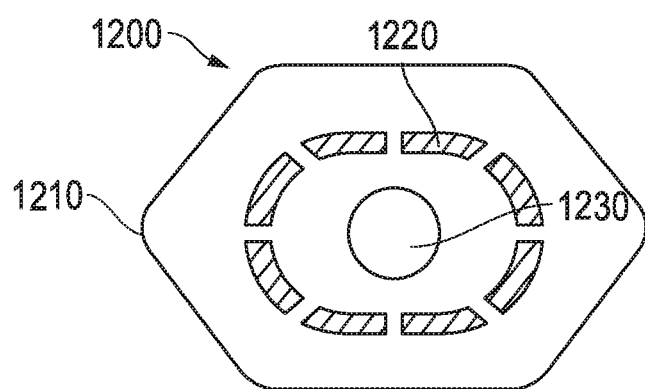
FIG. 12 is a diagram illustrating a plurality of light passages arranged on a camera module housing.

FIG. 12 is a diagram illustrating another example of a camera module 1200. In this example, a plurality of openings 1120 are arranged in an oval configuration around the camera lens 1230 and within a boundary formed by the camera module housing 1210. The camera module 1200 is configured to radiate different color light according to a desired application and in accordance with the examples described in this application. Any number of iterations can be appreciated to a person having ordinary skill in the art.

Figure 13:
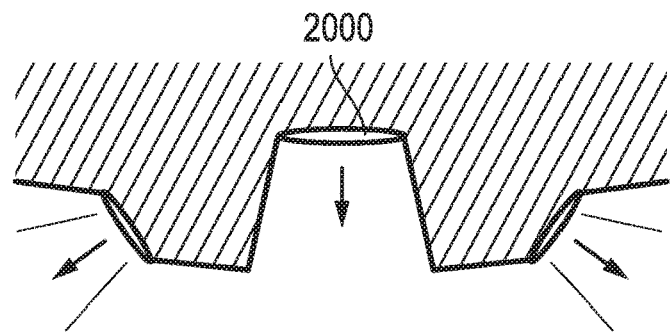
FIG. 13 is a diagram illustrating a first example of isolating a signal of a light source by alignment of the light source.

In addition, a number of different examples may be applied for isolating the light source and the light radiated by the light source from the camera. FIG. 13 is a diagram illustrating a first example of isolating a signal of a light source by alignment of the light source at angle with the camera 2000. In this example, the light source and the light emitted is arranged and radiated at an angle for isolation of the light.

Figure 14:
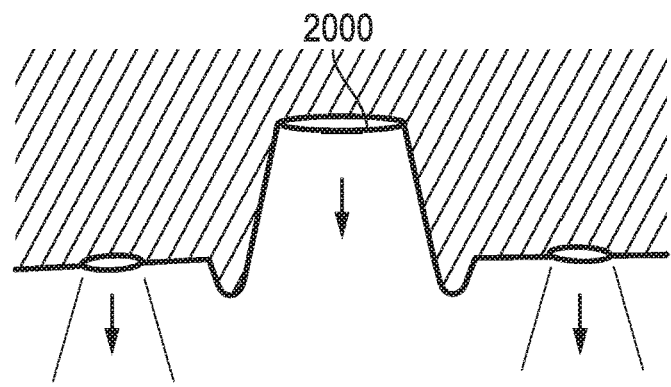
FIG. 14 is a diagram illustrating a second example of isolating a signal of a light source by including the light source as an integrated part of the camera module.

FIG. 14 is a diagram illustrating a second example of isolating a signal of a light source by including the light source as an integrated part of the camera 2000. In this example, the light source may include a bar, for example as illustrated in the drawing, which is integrated with the camera 2000.

Figure 15:
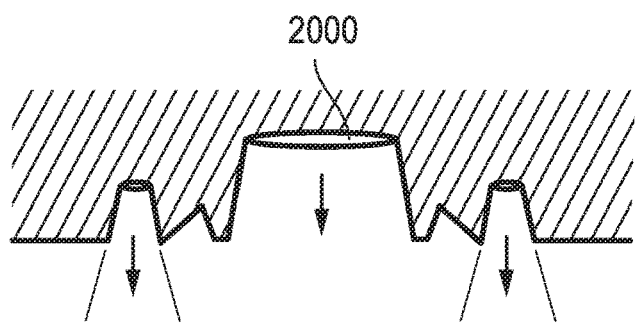
FIG. 15 is a diagram illustrating a third example of isolating a signal of a light source by including the light source in a slot if the camera module.

FIG. 15 is a diagram illustrating a third example of isolating a signal of a light source by including the light source in a slot of the camera module. In this example, the light source may be integrated in the camera module and in a slot that is positioned adjacent to the camera 2000 for isolating the light source and the radiated light from the camera 2000.

Figure 16:
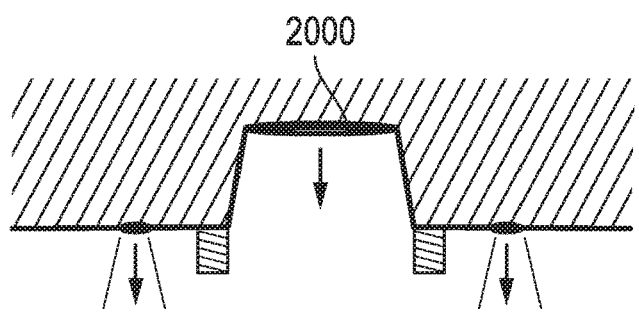
FIG. 16 is a diagram illustrating a fourth example of isolating a signal of a light source by including the light source as an attached part.

FIG. 16 is a diagram illustrating a fourth example of isolating a signal of a light source by including a separating bar, chrome ring, or some other isolating feature as an attached part. In this example, the attachable bar can be a different material that is attached adjacent to the camera 2000 and outside the camera module, as illustrated in the drawings.

According to these examples and the examples provided throughout the application, the light source may be isolated from the camera 2000 so that a signal from the light source does not interfere with an input of the camera 2000. Also, a signal of the light source is configured to be recognized by the driver but does not interfere with an input of the camera 2000.

It should be appreciated that specific colors of light are radiated for specific functions. For example, an orange light may be radiated for a turn light, a red or magenta light may be radiated for a blind spot indication, a yellow or light yellow light may be emitted for notifying that an item was forgotten in the vehicle such as a key or a smartphone, a yellow or dark yellow light for object detection warning, a purple light for a welcome, a green light for ambiance, among different examples of different colored lights for different applications. It should be appreciated that the color of the light and application is not limited to the examples provided herein. It is appreciated that several colors are legally restricted in certain jurisdictions such as blue or white forward light.

Figure 17:
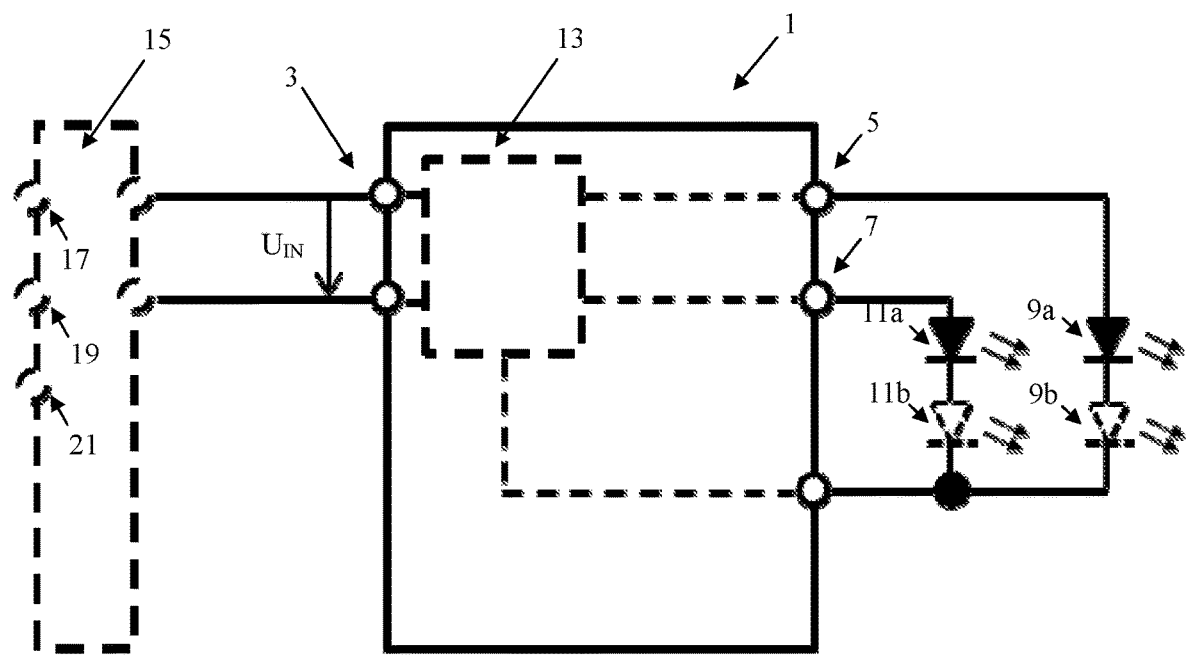
FIG. 17 is a diagram illustrating an example of a schematic view of a control circuit and a monitoring circuit.

FIG. 17 is a diagram illustrating an example of a schematic view of a control circuit and a monitoring circuit.

Referring to FIG. 17, the control circuit 1 for controlling a lighting application in a vehicle includes a voltage input channel 3 for receiving an input voltage $U_{IN}$, and a first output channel 5 and a second output channel 7. From FIG. 17, it can be seen that the first and second lighting devices comprise light sources 9a, 9b, 11a, 11b and are connected to the output channels 5, 7. In the shown example, two light sources 9a, 9b, 11a, 11b are connected to each output channel 5, 7. However, the skilled person would know that in embodiments of the invention only one single light sources 9a, 11a could be connected to each output channel 5, 7. Therefore, the second light sources 9b, 11b are shown with dotted lines.

Also shown with dotted lines is a filter circuit 13 that can be used in some embodiments of the invention to extract the first information and the second information from the input voltage $U_{IN}$. Depending on the first information and the second information, the first output channel 5 is adapted to control the on and off states of the first lighting device light sources 9a, 9b connected thereto, and the second output channel 7 is adapted to control the on and off states of the second lighting device light sources 11a, 11b connected thereto. The skilled person would know that the filter circuit 13 could comprise two transistor to switch between the lighting devices, i.e. depending on the input voltage $U_{IN}$.

FIG. 17 also illustrates a monitoring circuit 15 that could be connected in some embodiments to the control circuit 1 and which could be adapted to supply the input voltage $U_{IN}$ to the control circuit 1. As it is exemplarily shown in FIG. 17, the monitoring circuit 15 could comprise various interfaces, e.g. a first interface 17 for connecting a RFID receiver, a second interface 19 for connecting a GPS receiver, and a third interface 21 for connecting an Onboard Diagnostic System. The skilled person should appreciate, however, that the monitoring circuit 15 could also comprise just one of the above mentioned interfaces, and that the input voltage $U_{IN}$, i.e. the first and second information, is generated based on signals on the interfaces 17, 19, 21. Here, it should be appreciated by a person having ordinary skill in the art that the monitoring circuit 15 could be comprised in a Electronic Control Unit, ECU.

Figure 18:
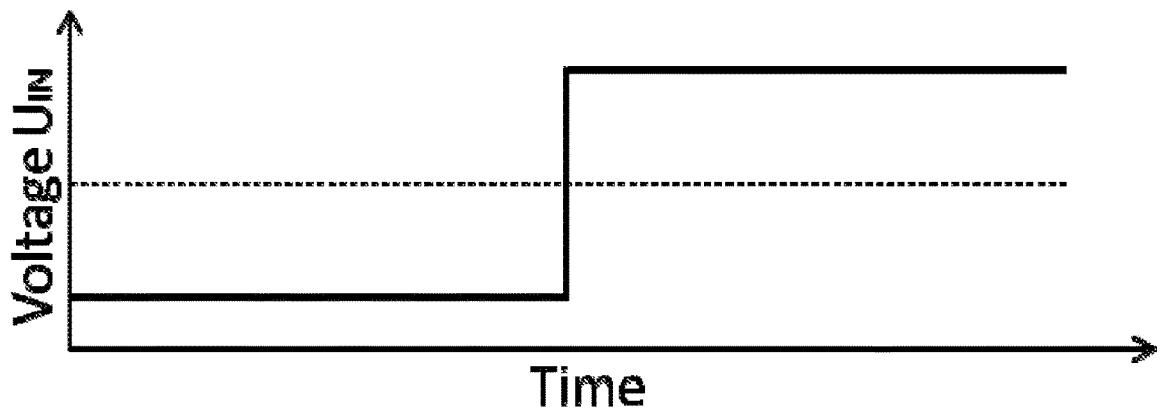
FIG. 18 is a diagram illustrating an example of a schematic voltage versus time diagram of an input voltage.

FIG. 18 illustrates a schematic voltage versus time diagram of an input voltage $U_{IN}$ according to a first embodiment of the invention. In the figure, a dotted line is used to indicate the threshold, or threshold voltage. As it can be seen from the figure, the voltage remains at a level below the threshold for some period of time. By measuring the input voltage $U_{IN}$ it can be determined that the first information is conveyed by the input voltage $U_{IN}$, because the input voltage $U_{IN}$ is below the threshold. In that case, the first output channel turns on the first lighting device, and the second output channel turns off the second lighting device, or keeps the second lighting device turned off. When the input voltage $U_{IN}$ raises above the threshold, the first output channel turns the first lighting device off, and the second output channel turns the second lighting device on, i.e. for as long as the input voltage $U_{IN}$ is above the threshold.

Figure 19:
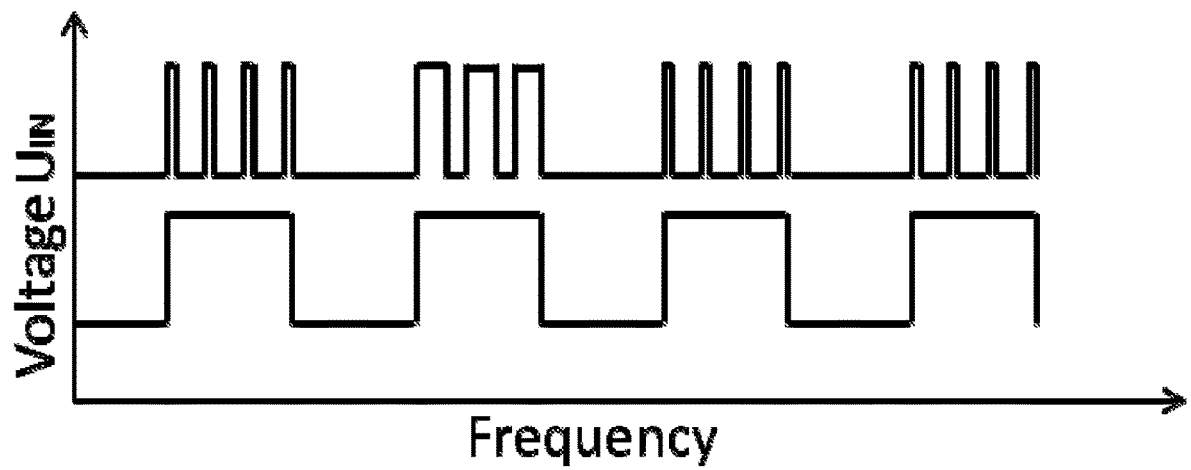
FIG. 19 is a diagram illustrating another example of a schematic voltage versus frequency diagram of an input voltage.

FIG. 19 shows a schematic voltage versus frequency diagram of an input voltage according to a second embodiment of the invention. Here, on the top of the diagram, the input voltage $U_{IN}$ is shown as pulsed input voltage alternating between high and low, e.g. on and off, respectively. The frequency could be, for example, in the region of 1 Hz. On the bottom of the diagram a duty cycle rate is exemplarily shown. In the context of this invention, the term "duty cycle" is used to define the percentage of one period in which the input voltage $U_{IN}$ is high, or switched on, respectively. In the first, third and fourth periods that are exemplary shown in FIG. 19, the duty cycle might be 20%, and hence might allow the determination that the first information is conveyed in the input voltage $U_{IN}$. In the second period that is exemplarily shown in FIG. 19, the duty cycle might be 50%, and hence might allow the determination that the second information is conveyed in the input voltage $U_{IN}$.

Figure 20:
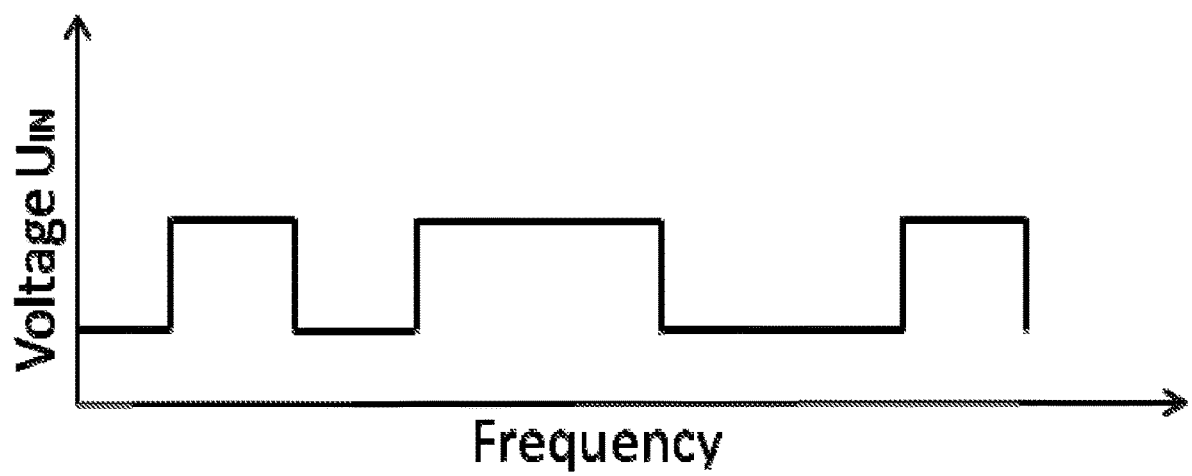
FIG. 20 is a diagram illustrating yet another example of a schematic voltage versus frequency diagram of an input voltage.

FIG. 20 illustrates a schematic voltage versus frequency diagram of an input voltage according to a third embodiment of the invention. Here, it is exemplarily shown that the first and third periods have a higher frequency than the second period. Therefore, determining the higher and/or lower frequency allows to determine that either the first and/or the second information is conveyed.

Figure 21:
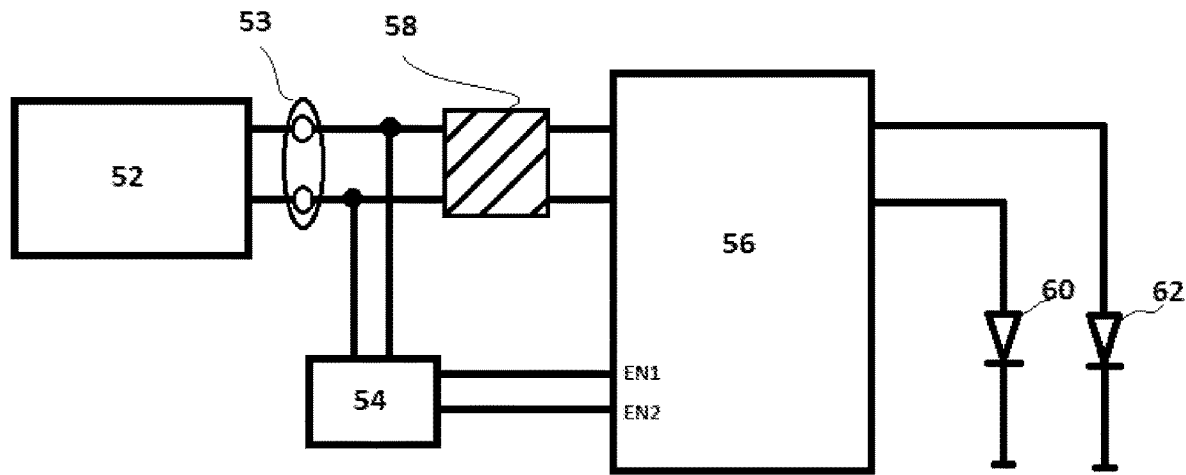
FIG. 21 is a diagram illustrating an example of a control circuit for controlling at least two light sources at the same time.

FIG. 21 illustrates a monitoring circuit or Electronic Control Unit (ECU) 52 that may be connected to a control circuit and is adapted to supply a pulse width modulation (PWM) signal thereto. The control circuit is adapted to convert different PWM signals to power on and off one or more light sources. As shown in FIG. 21, the control circuit may include a connector 53 which connects the ECU 52 to the control circuit, a filter 54, a PWM processor 58, and an LED driver 56. The control circuit may be connected to at least a first light source 62 and a second light source 64. As described above in reference with FIG. 17, the monitoring circuit or ECU 52 may contain one or more interfaces for interfacing with systems of the vehicle.

Still referring to FIG. 21, a PWM signal is initially supplied by the ECU 52. In an example, the LED driver 56 is enabled via the filter 54 to clear an input. Whether an input is cleared can depend on the duty cycle of the transmitted PWM signal. For example, the duty cycle may range from 0 to 100% and includes a duty cycle of at least 0, at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, at most 100%, at most 95%, at most 90%, at most 85%, at most 80%, at most 75%, at most 70%, at most 65%, at most 60%, at most 55%, at most 50%, at most 45%, at most 40%, at most 35%, at most 30%, at most 25%, at most 20%, at most 15%, at most 10%, and at most 5%. The cleared input may determine which, if any, of the first or second light sources are powered on or off.

Figure 22:
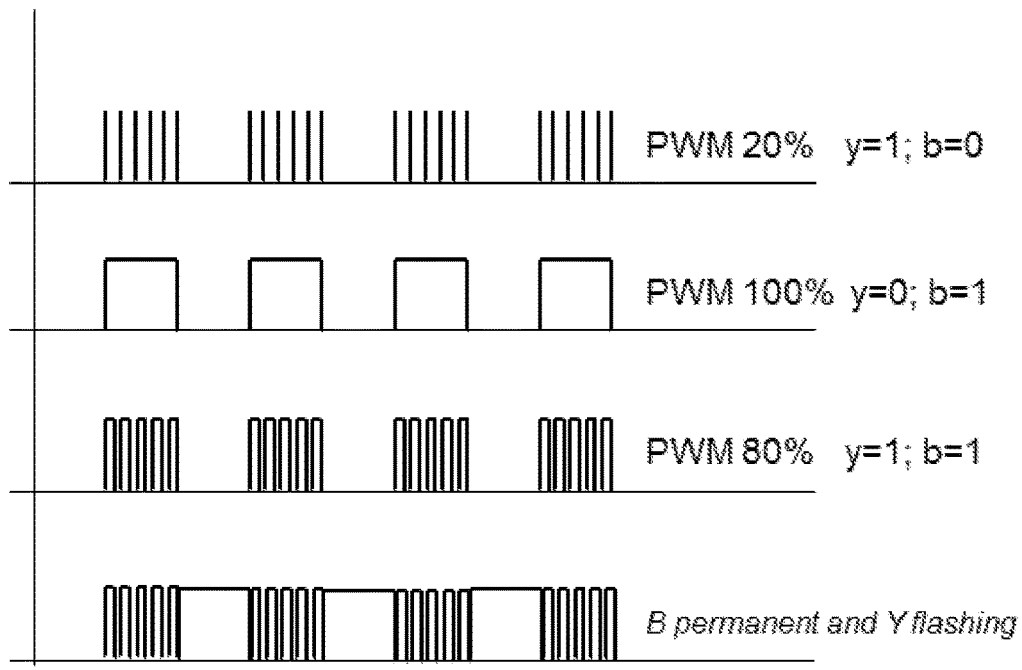
FIG. 22 is a diagram illustrating a schematic voltage versus time diagram of an input voltage according to a number of examples.

FIG. 22 is a diagram illustrating a schematic voltage versus time diagram of an input voltage according to a number of examples. As shown in FIG. 22, a PWM signal being transmitted controls the operation of the first light source 62 and the second light source 64. In this example, the first light source 62 is a yellow light and the second light source 64 is a blue light. According to the example illustrated in FIG. 22, if the ECU 52 transmits a PWM signal with a 20% duty cycle, the LED driver 56 is enabled via the filter 54 to clear an input. In this case, when the input is cleared, the yellow LED 62 is switched on, as shown on the first line of FIG. 22. In response to a PWM signal with a duty cycle of 100%, the blue LED 64 may be unlocked via the filter 54, as shown on the second line of FIG. 22. To power on both LEDs 62, 64, a PWM signal with a duty cycle of 80% is transmitted to clear both inputs, as shown on the third line of FIG. 22.

On the fourth line of FIG. 22, with only two lines connected to the ECU 52, the ECU 52 is adapted to control the first and second light sources 62, 64 so that one light is flashing while the other light is permanently on. In this case, the flashing light may be the yellow light which is functioning as a turn signal, and the permanent light may be the blue light which is functioning as an autonomous vehicle indicator. The ECU 52 may alternate from 80% PWM to 100% PWM in the frequency of a turn signal. As a result, the light switches between blue and yellow on at the same time (80% PWM) to only blue on (100% PWN). In other words, blue is permanently activated, while yellow is flashing. In an aspect, the cost savings of providing only two cables which allow for more versatile coding and control provide an advantage of a more compact and cost-effective solution.

Referring still to FIGS. 21 and 22, the ECU 52 sends a signal of PWM 20% alternately, then filter circuit 54 picks up this frequency and enables the correct LED to switch on. In one example, LED 60 is yellow and LED 62 blue. As discussed, if the desired result is y=1 to flash normally, then a PWM 20% signal is alternately transmitted in the usual flashing frequency and the filter then switches over the EN1, thus the yellow LED is clear.

In response to PWM 100%, then the LED 62 is activated via the filter, i.e. to turn on the blue light. This can be either permanent or flashing depending on how the signal is transmitted. At PWM 80%, both ENs are enabled. As a result, both blue and yellow light up. However, in order to blink yellow and turn on blue permanently, the signal from the filter 52 is alternately sent with PWM 80% and 100% as shown in FIG. 22. As a result, EN2 is enabled once at PWM 100% and thus blue light is turned on, and once both ENs are enabled, thus yellow and blue light are turned on. This results in permanent blue light and flashing yellow light.

The first light source may be used as a turn signal and the second light source may be used to mark an autonomous vehicle; however, each light source may be used for a number of different functions as described throughout this application and known to a person of ordinary skill in the art. While a first light source and second light source is described, each of the first light source and the second light source may include a plurality of lights. Also, the colors of the lights are not limited to the examples described herein, nor are the specific PWM values limited to those described herein.

It will be appreciated by those skilled in the art that changes could be made to the embodiments described above without departing from the broad inventive concept thereof. It is understood, therefore, that the invention disclosed herein is not limited to the particular embodiments disclosed, but it is intended to cover modifications within the spirit and scope of the present invention as defined by the appended claims.

The invention claimed is:

1. A control circuit for controlling a lighting application in a vehicle, comprising:
   an input channel for receiving a pulse width modulated (PWM) signal;
   a filter configured to extract information received by the input channel;

a first light source and a first output channel which is adapted to control on and off states of the first light source depending on the extracted information; and a second light source and a second output channel which is adapted to control on and off states of the second light source connected to the second output channel depending on the extracted information, wherein the first output channel is adapted to turn the first light source on and the second output channel is adapted to turn the second light source off based on a first PWM signal, the first output channel is adapted to turn the first light source off and the second output channel is adapted to turn the second light source on based on a second PWM signal, the first output channel is adapted to turn the first light source on and the second output channel is adapted to turn the second light source on, at the same time, based on a third PWM signal, and in response to either the first PWM signal or the second PWM signal being transmitted consecutively with the third PWM signal during a period of time, one of the first light source or the second light source is permanently lit while another of the first light source or the second light source flashes on and off.

2. The control circuit of claim 1, wherein the first and the second light source comprise at least one light each or an array of lights, wherein the first light source comprises a first light having a first color, and wherein the second light source comprises a second light having a second color.

3. The control circuit of claim 2, wherein the first and second colors are different colors, and wherein the first and second light sources are provided in a side-turn indicator.

4. The control circuit of claim 1, wherein each of the first and second light sources comprises at least one of a Light Emitting Diode (LED), a light bulb, a halogen lamp, an arc lamp, a Xenon arc lamp, a fluorescent lamp, a neon lamp, and an electrodeless lamp.

5. The control circuit of claim 1, wherein at least one of the first output channel or the second output channel comprises a delay circuit for time delaying the at least one of the first output channel or second output channel.

6. The control circuit of claim 1, wherein the first PWM signal comprises a duty cycle rate of 20%, the second PWM signal comprises a duty cycle rate of 100%, and the third PWM signal comprises a duty cycle rate of 80%.

7. The control circuit of claim 1, wherein the filter is configured to extract information from each of the first PWM signal, the second PWM signal, and the third PWM signal.

8. The control circuit of claim 1, wherein the PWM signal comprises a supply voltage for at least one of the first light source or the second light source.

9. A rear view display device for a vehicle, comprising the control circuit of claim 1.

10. A control circuit for controlling a lighting application in a vehicle, comprising:
a first light source;
a second light source;
an input channel for receiving an input signal;
at most two output channels each configured to control one of the first light source and the second light source,
wherein the control circuit is configured to use at most two cables, and is capable of permanently powering on one of the first light source or the second light source while, at the same time, flashing on and off another of the first light source or the second light source, and
permanently powering on the one of the first light source and the second light source while, at the same time, flashing on and off the other of the first light source and the second light source is achieved by sending two PWM signals one after the other for a period of time.

11. The control circuit of claim 10, wherein the input signal is a pulse width modulated (PWM) signal.

12. The control circuit of claim 10, wherein the two PWM signals have different duty cycles.

13. The control circuit of claim 10, wherein the first and the second light source comprise at least one light each or an array of lights, wherein the first light source comprises a first light having a first color, and wherein the second light source comprises a second light having a second color.

14. The control circuit of claim 13, wherein the first and second colors are different colors, and wherein the first and second light sources are provided in a side-turn indicator.

15. The control circuit of claim 10, wherein each of the first and second light sources comprises at least one of a Light Emitting Diode (LED), a light bulb, a halogen lamp, an arc lamp, a Xenon arc lamp, a fluorescent lamp, a neon lamp, and an electrodeless lamp.

16. The control circuit of claim 10, wherein one or both of the at most two output channels comprises a delay circuit for time delaying the one or both of the at most two output channels.

17. The control circuit of claim 10, wherein the input signal is a PWM signal comprising a duty cycle rate of 20%, 80%, or 100%.

18. The control circuit of claim 10, wherein the control circuit comprises at least one filter circuit to extract information from the input signal.

19. The control circuit of claim 10, wherein the input signal comprises a supply voltage for at least one of the first light source or the second light source.

20. A rear view display device for a vehicle, comprising the control circuit of claim 10.

* * * * *